Patented May 4, 1943

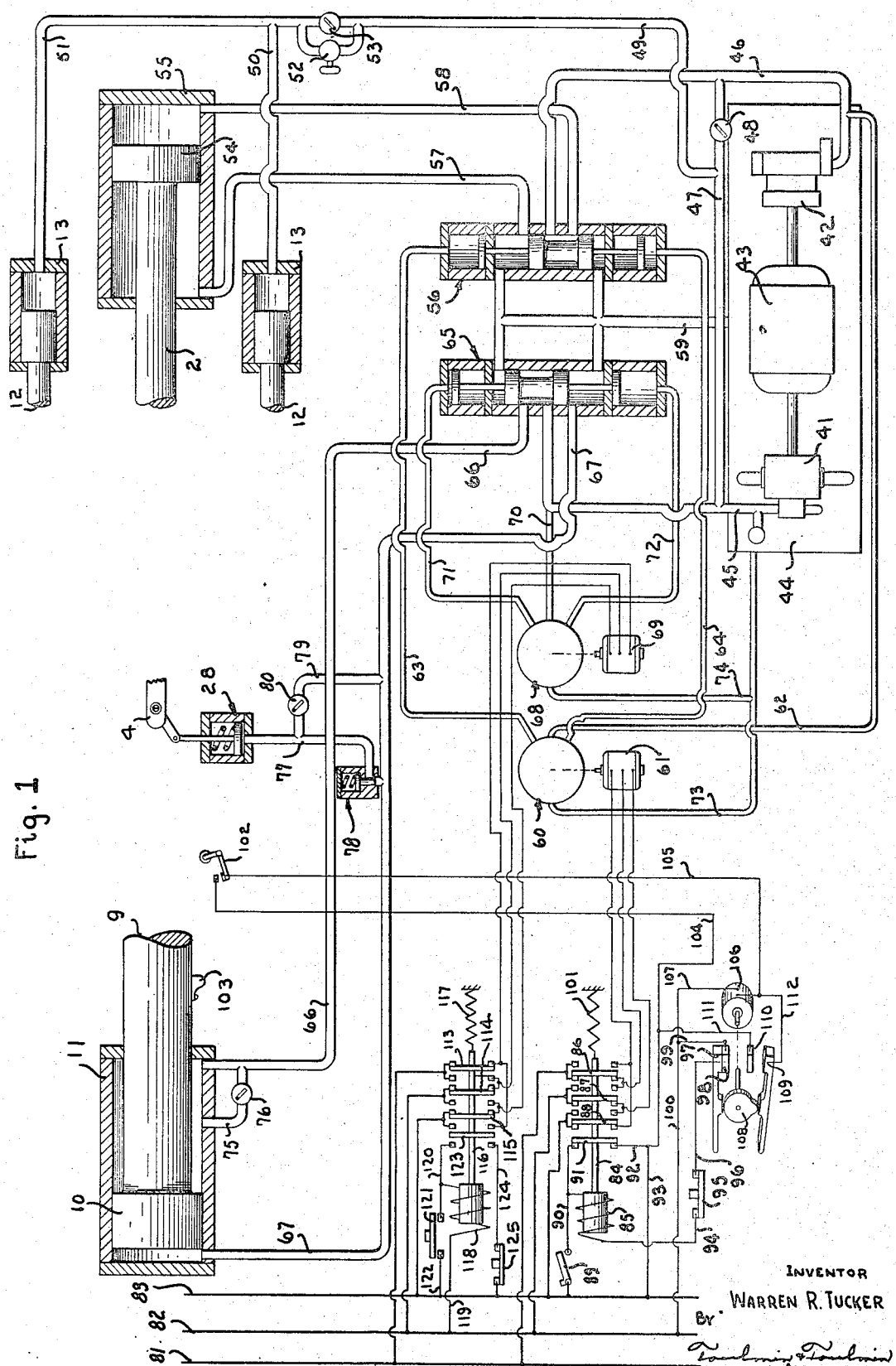

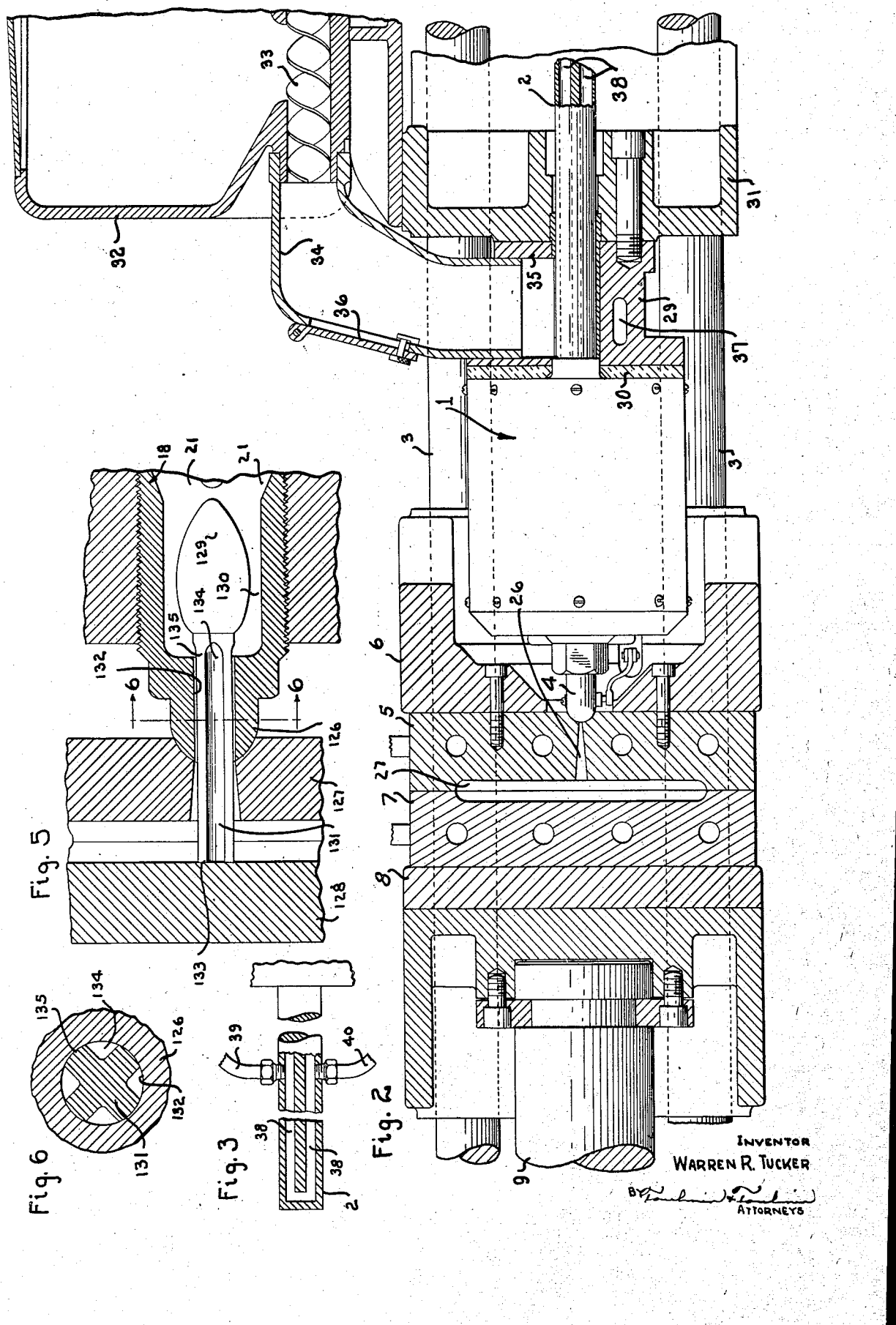

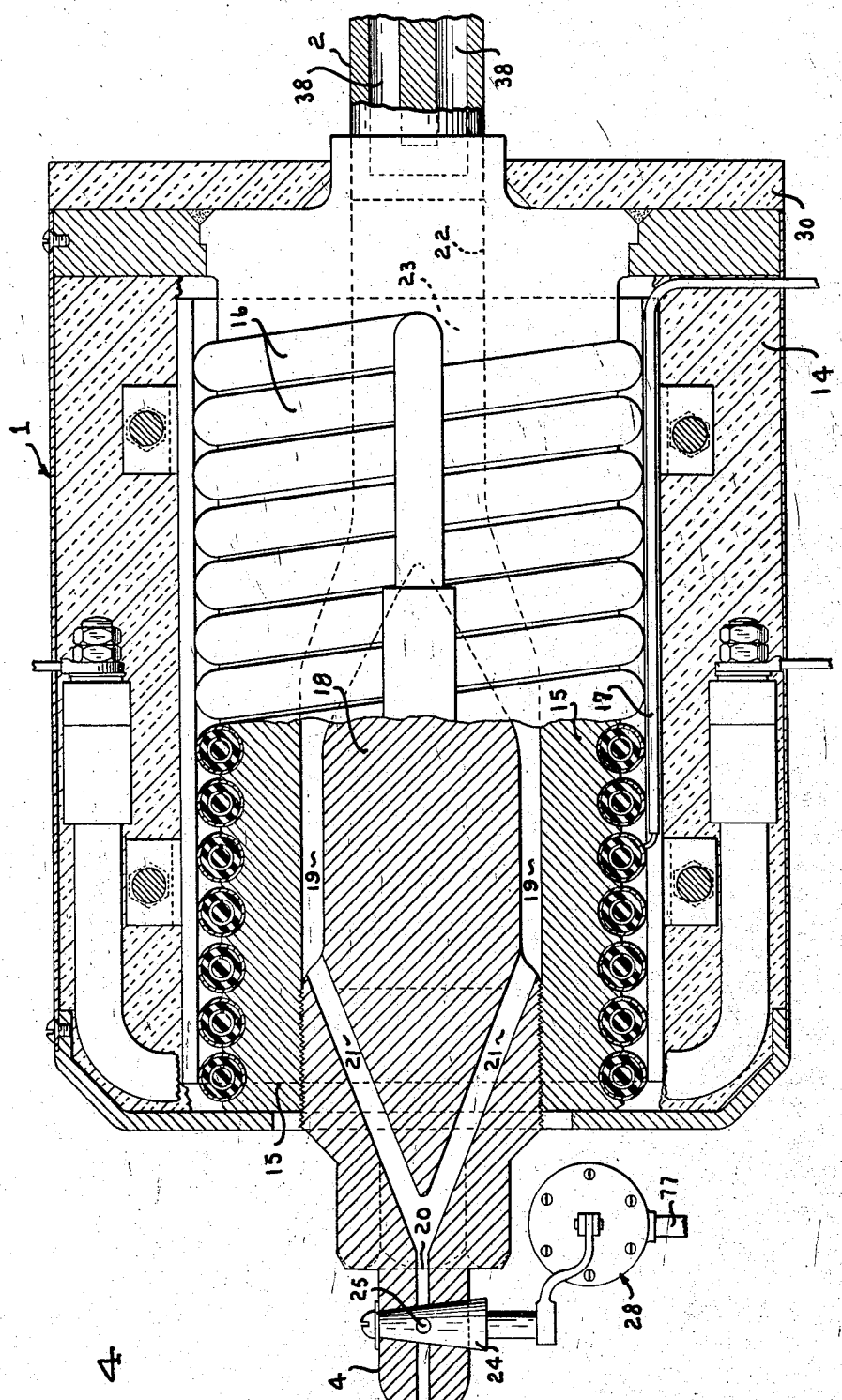

2,318,031

UNITED STATES PATENT OFFICE 2,318,031

APPARATUS FOR INJECTION MOLDING THERMOSETTING COMPOUNDS

Warren R. Tucker, Dayton, Ohio, assignor to The Hydraulic Development Corp. Inc., Wilmington, Del., a corporation of Delaware Application December 18, 1939, Serial No. 309,798

8 Claims. (Cl. 18—30)

This invention relates to apparatus for injection molding of thermosetting compounds such as for example the thermosetting phenol formaldehyde resins, urea formaldehyde resins, phenol modified urea resins, urea modified phenolic resins, and other thermosetting resinous compounds and mixtures.

It is an object of the present invention to devise an apparatus which makes possible the injection molding of a thermosetting material by allowing the plastic thermosetting material to be heated to the fluent injectable form in an injection cylinder without being converted in the injection cylinder to the nonplastic state; the thermosetting material thus rendered fluent is injected into the mold cavity while in this fluent form and is subsequently hardened in the mold cavity; the material being heated in the injection cylinder is prevented from appreciably losing its plasticity and from undergoing to any appreciable extent the irreversible reaction which characterizes the setting of thermosetting materials.

It is another object of the present invention to carry out the processes outlined above by preventing the escape of gases from the thermosetting plastic as it is being heated in the injection cylinder; in this way, the plastic may be heated sufficiently to soften it and to render it injectable and it will stay in this plastic condition until the gas is liberated; in a preferred form, the escape of gas is substantially completely prevented while the material is in the injection cylinder and after it has been injected into the mold cavity the gas which tends to be given off is allowed to freely escape and thus the thermosetting reaction may be carried to completion in the mold cavity; the present invention is based upon the fact that when thermosetting molding materials are heated, to cause them to set an irreversible reaction takes place which is chemical in nature and causes the liberation of certain gases, and that if these gases are prevented from escaping, the plastic thermosetting material will soften and remain fluent until the gas is liberated, even though heated to a point which would cause initiation of the thermosetting reaction were the material unconfined and the gases free to escape.

It is another object of the present invention to devise apparatus for the carrying out of the process as outlined above, wherein the plastic in the injection cylinder is confined so that the gases which are first given off quickly build up a very high pressure which is exerted upon the plastic itself and prevents the liberation of more gas therefrom, and wherein the material thus rendered fluent is injected into the mold cavity while maintaining confined that portion thereof which remains in the injection cylinder.

Another object is to devise apparatus of the type just outlined wherein an extremely close fit is provided between the injection plunger and the injection cylinder, so as to positively prevent the escape of gases between the injection plunger and the wall of the injection cylinder; in one form of apparatus, this result has been attained by making the injection plunger slightly larger in diameter than the receiving bore therefor in the injection cylinder, and by heating the injection cylinder in the usual manner, while cooling the injection plunger so as to reduce its diameter to the point where it will just enter the injection cylinder; in this way, an extremely small clearance is provided between the plunger and cylinder wall and the escape of gases therebetween is eliminated whereby it is possible to allow a relatively high gas pressure to be built up by the thermosetting material being heated in the heating chamber; another advantage of cooling the injection plunger is that the flow of plastic material by the injection plunger which might cause galling of the sliding parts is prevented since the plastic immediately ahead of the injection plunger is maintained in its granular nonfluent form.

Another object is to provide apparatus of the foregoing type wherein the injection nozzle is valved and wherein suitable means is provided for actuating the valve at the time of injection so as to allow injection of the fluent thermosetting material from the injection cylinder into the mold cavity; in a preferred form, this valve is actuated at the time when the mold parts have been clamped together.

Another object is to provide apparatus for carrying out conveniently the process outlined above, whereby the operator may conveniently and rapidly carry out this process; in a preferred form substantially all of the operations of the machine are automatic and it is necessary for the operator to manipulate only the mold clamping switch and the mold unclamping switch.

Numerous other objects of the present invention will more fully appear from the following detailed description of modes of carrying the same into practice and of one form of apparatus which has been found particularly advantageous for the carrying out of this process.

In the accompanying drawings:

Fig. 1 is a diagrammatic view of an apparatus which has been employed in carrying out the principles of the present invention.

Fig. 2 is a longitudinal vertical section through the mold halves, the bolsters, the feeding mechanism and the mechanism surrounding the injection plunger, the clamping ram and the injection cylinder being shown in elevation.

Fig. 3 is a detailed view of the injection plunger showing the hydraulic ram therefor and showing the connections thereto for cooling the same.

Fig. 4 is a longitudinal sectional view through the injection cylinder with the rear portion of the injection cylinder proper in elevation.

Fig. 5 is a detailed longitudinal section showing a modification; in this modification a valve member is pushed rearwardly by the action of clamping the mold halves together and to the injection cylinder.

Fig. 6 is a section taken on the line 6—6 of Fig. 5, looking in the direction of the arrows.

GENERAL PROCEDURE

In accordance with the process of the present invention, a thermosetting molding material is heated in an injection cylinder to the point of fluency while preventing the liberation of gases therefrom, and the fluent material thus obtained is injected into the mold cavity where the material is subjected to heat to cause it to harden into the final shape and wherein the free escape of gases is permitted. The thermosetting reaction of the thermosetting materials is a chemical reaction, taking place under the application of heat at or above a certain critical temperature, and causes the liberation of certain gases from the material as the reaction proceeds. If these gases are prevented from escaping from the material by suitable means, the plastic material will soften and will remain fluent until the gas is liberated. Thus, by bringing the plastic material up to a temperature at or slightly above the critical temperature mentioned above while preventing the escape of gas therefrom, softening and flow of the material will take place without the setting reaction occurring. Then by injecting a portion of the material into the die and allowing the gas to escape from the material after it leaves the heating chamber and while the piece is in the die, injection molding of thermo-setting materials may be accomplished. The die will be held at a temperature at or above the critical setting temperature mentioned above and preferably well above this temperature in order to assist in the driving off of the gas in the mold. Conventional dies may be employed, it being understood that such dies allow the free venting of the molded article, dies being provided with venting passageways in order to allow the escape of the air in the die as the material being molded is injected into the mold. In many cases, the dies need not have special venting passageways because it is frequently impossible or impracticable to make an absolutely tight fitting die assembly.

Once during each cycle, additional plastic is desirably added to the heating chamber where it is progressively heated to the softening point. The general construction of a machine for carrying out the foregoing process will be similar to that of the present injection molding machine used for injection molding of thermoplastic molding materials. The injection plunger will fit very closely in order to prevent gas escaping between it and the injection cylinder. The injection nozzle is provided with a valve which closes off and opens the injection passageway leading from the heating chamber. Means is provided for opening this valve at the time when injection is desired. Thus, the escape of gases from the heating chamber is prevented. The injection plunger will be at substantially all times held under pressure against the material in the heating chamber and consequently the material therein will substantially fill the heating chamber thus provided and the preliminary slight escape of gases from the material to this closed chamber will develop a very high gaseous pressure in the heating chamber. It will be understood that the injection plunger will be brought forward and held against the plastic in the heating chamber under high pressure, this feature further aiding in the prevention of the liberation of gases from the plastic material. Then when it is desired to fill the mold cavity, the mold halves will be closed whereupon the valve in the injection passageway or nozzle will be opened, whereupon the injection plunger will move forward under this same pressure, causing injection to take place. After the mold cavity is filled, it is preferable to hold the injection plunger forward under the same pressure until the molded article has cured sufficiently to hold its shape, whereupon the nozzle valve will be closed, the injection plunger retracted for a new charge and brought quickly forward so as to prevent as far as possible escape of gases from the heating chamber. As the injection plunger comes forward, it will compress the new charge into the heating chamber. Meanwhile, the mold halves have been unclamped, the molded article removed and the apparatus is now ready for a repetition of the cycle.

Apparatus employed

The process of the present invention can perhaps best be understood by a description of the apparatus shown in the drawings, wherein the injection cylinder or heating chamber is designated generally as 1 and is adapted to have the injection plunger 2 reciprocated in its bore. The injection cylinder 1 is fixedly mounted in any suitable manner upon the strain rods 3 which extend longitudinally of the machine. The cylinder 1 has the injection nozzle 4 against which the mold half 5, fixedly carried upon the bolster 6 which is slidable relative to strain rods 3, is adapted to be moved into injecting relationship. Cooperating with mold half 5 to form the mold cavity is the other mold half 7 which is fixedly carried by a bolster 8 which is likewise slidably mounted upon the strain rods 3 in any suitable manner and which is adapted to be moved by the clamping ram 9 which is integral with a hydraulic piston 10 reciprocable within a hydraulic cylinder 11, the cylinder 11 and the piston 10 forming a double-acting hydraulic motor for actuation of the mold clamping ram so as to unclamp and clamp the mold halves together and into injecting engagement with the injection cylinder 1.

In order to relieve the injection nozzle 4 of a considerable portion of the mold clamping load, the bolster 6 which carries the mold half 5 is mounted in any suitable manner so as to move cushioning rams 12 (Fig. 1) rearwardly in cushioning cylinders 13. The cushioning cylinders 13 and the clamping cylinder 11 are supplied with pressure liquid from a common source and therefore at the same pressure. The effective cushioning area of the rams 12 is somewhat smaller than the effective clamping area of the clamping ram 9. Thus, for example, the clamping ram might exert a pressure of 40,000 pounds while the cushioning rams might exert a pressure in the opposite direction of 35,000 pounds, causing the pressure applied by the mold half 5 to the injection nozzle 4 to be limited to 5,000 pounds, which is sufficient to cause tight engagement therebetween but insufficient to cause injury to or deformation of the nozzle 4. It will be understood that the cushioning cylinders 13 are fixedly mounted with respect to the strain rods 3. The cushioning cylinders 13 and cushioning rams 12 are shown in Fig. 1, but are not seen in Fig. 2 because they are mounted in the same horizontal plane as the injection cylinder 1 and therefore one of them is concealed behind the apparatus shown in Fig. 2, while the other is forwardly thereof and is therefore not seen in the medial section represented by Fig. 2.

The injection cylinder 1 is of substantially a conventional type, having a heat insulating jacket 14 of rock wool surrounding the injection cylinder proper designated as 15. Between jacket 14 and cylinder 15 are a pair of spirally wound electrical heating elements 16, these heating elements being alternately disposed around the heating cylinder 15. A thermostat 17 is provided inwardly of the jacket 14 and this thermostat is adapted by suitable connections to control the application of electrical energy to one or both of the heating elements 16 so as to maintain the desired temperature in the heating chamber. The heating cylinder is provided with the conventional torpedo 18 which is screwed into the forward end of cylinder 15 and which forms the annular heating space 19 connected to the injection passageway 20 by the forwardly converging passageways 21 in the torpedo 18. When the injection plunger 2 is received within the cylindrical bore 22 provided therefor in the cylinder 15, there is formed a cylindrical space 23 ahead of the injection plunger, which space is adapted to be varied in size by the movement of injection plunger 2.

Valve for injection nozzle

The injection nozzle 4 is provided with a valve for opening and closing the injection passageway 20, this valve being shown as taking the form of a tapered valve member 24 which has a transverse bore 25 therethrough whereby when the valve member 24 is rotated to a position at right angles to that shown in Fig. 4, the bore 25 which is of the same diameter as passageway 20 allows free passage of the fluent plastic material out of the injection nozzle 4 into the sprue passageway 26 (Fig. 2), thence into the mold cavity 27 formed by the mold halves 5 and 7, and when the valve member 24 is in the position shown in Fig. 4, the heating chamber is tightly sealed and plastic therein cannot escape outwardly through the passageway 20.

For actuating the valve 24, a hydraulic motor 28 is provided, this hydraulic motor having a piston which is operatively connected to the valve member 24 and which is normally spring-pressed in such a direction as to maintain the valve 24 closed. When the hydraulic motor 28 is supplied with liquid under pressure, its piston is actuated in such direction as to open the valve 24 and to allow injection to take place.

Charging mechanism

Disposed rearwardly of the injection cylinder 1 is suitable supporting mechanism which supports charging mechanism for charging the heating chamber. The injection cylinder 1 may be mounted ahead of a member 29 (Fig. 2), being separated therefrom by the layer of heat insulation 30, member 29 being fixedly carried by a supporting member 31 which is fixedly attached in any suitable manner to the strain rods 3 and thus supports the injection cylinder 1 against movement with respect to rods 3. The supporting member 31 also supports above it a hopper 32 which is adapted to receive the cold granular plastic and which is provided with a screw conveyor 33 for conveying the material into a feed elbow 34, the lower end of which is tightly received in the upper portion of member 29. Thus, the screw conveyor 33 is adapted to supply under continuously exerted pressure the granular plastic material above the injection plunger 2 in the member 29 so that when the injection plunger is retracted, this granular material is forced downwardly ahead of it and when the injection plunger is moved forwardly, the charge thus placed ahead of it is compelled to move into the space 23 which constitutes the rear portion of the heating chamber. In practice, it is desirable to retract the injection plunger 2 until its forward end is substantially in alignment with the rear wall 35 of the feed pocket in the member 29 whereby a maximum charge is moved into the injection cylinder with each stroke of the plunger 2. For inspecting the charging or for removing plastic from the feed elbow 34, a normally tightly closed door 36 may be provided in the feed elbow 34.

The heat insulation 30 tends to prevent the transfer of heat from the injection cylinder 1 to the member 29 and to the granular plastic above the injection plunger 2 and in the feed elbow 34. However to further prevent softening of the granular plastic before it has been transferred into the injection cylinder 1, a cooling passageway 37 is provided in the member 29. This passageway 37 may be annular so as to partially encircle injection plunger 2 and is supplied in any suitable manner with a cooling medium.

Means for insuring gas tight fit of injection plunger

In order to attain a fit between the injection plunger 2 and the bore 22 in the injection cylinder 15 which will prevent the escape of gases even though an extremely high gaseous pressure is developed in the heating chamber, the plunger 2 is made slightly larger than the bore 22 when the plunger 2 and the injection cylinder 15 are at the same temperature, say room temperature. For example, the plunger may be from .001 to .0005 in. larger than bore 22. The injection plunger 2 is cooled so as to reduce its size to just under that of bore 22. It will be understood that since the injection cylinder 15 is heated, its bore 22 will expand somewhat and by cooling the injection plunger an extremely close fit which is gas tight but which allows sliding of the injection plunger 2 in the bore 22 is obtained. To maintain the injection plunger 2 at this relatively reduced size, it is provided with the cooling passageway 38 which extends up to a point close to the forward end of the injection plunger and which is supplied with cooling liquid by means of flexible conduit 39 (Fig. 3), and from which the cooling liquid is discharged by means of flexible conduit 40.

Another desirable advantage of cooling the injection plunger 2 is that the granular plastic immediately ahead of it is prevented from becoming fluent and flowing around the injection plunger. In addition, the granular plastic above the injection plunger 2 and in the feed elbow 34 is prevented from becoming fluent, which might interfere with the charging operation.

In addition to the foregoing provisions for obtaining a close fit between the plunger 2 and the bore of the injection cylinder, it is desirable to make the surfaces of the injection plunger 2 and of the bore 22 "super-finished." In some cases, it may be desirable to make these parts or surfaces of extremely hard material, for example by making them of high chrome steel or chromium plating them. These expedients further aid in the preventing of galling and in the maintenance of a gas tight but relatively easily slidable fit therebetween.

Hydraulic circuit

For operating the several hydraulic devices, high pressure liquid is supplied by a high pressure pump 41 and low pressure liquid at relatively large volume is supplied by a low pressure pump 42, these pumps being driven by an electrical motor 43 and drawing liquid from a tank 44. The output of high pressure pump 41 is delivered into a conduit 45. The low pressure pump 42 discharges into a conduit 46. A conduit 47 connects conduits 45 and 46. A check valve 48 is located in connecting conduit 47 and serves to allow liquid to pass from conduit 46 to conduit 47 but to prevent the reverse flow of liquid. This check valve 48 closes when the pressure in line 45 exceeds a predetermined high figure, thus preventing the low pressure from entering conduit 47 and shifting the operation of the clamping and cushioning cylinders from low pressure to high pressure derived from high pressure pump 41. A conduit 49 connects with conduit 47 on the side of check valve 48 adjacent conduit 45. This conduit 49 leads to conduits 50 and 51 which connect with the cushioning cylinders 13. Check valve 53 is disposed in conduit 49 and allows the fluid pressure in conduit 47 to be freely applied to the cushioning cylinders 13. A choke valve 52 is disposed in parallel with check valve 53 and serves to restrict the outflow from cushioning cylinders 13, thereby insuring that the mold halves 5 and 7 are clamped securely together before the mold half 5 is in intimate contact with injection nozzle 4.

Hydraulic control of injection plunger

The hydraulic circuit is so arranged that the high pressure output of pump 41 is never applied to the injection plunger 2 which is actuated by the piston 54 in the hydraulic cylinder 55, and that the double-acting hydraulic motor which actuates injection plunger 2 is always operated by the low pressure output of pump 42. In order to accomplish this, the low pressure conduit 46 is connected to a four-way valve 56 for controlling the injection plunger 2. The service conduit 57 connects four-way valve 56 to the forward side of piston 54 and a similar service conduit 58 connects the valve 56 to the rear side of piston 54. The valve member in valve 56 is adapted to connect either conduit 57 or conduit 58 to the inlet conduit 46 and to connect the other conduit, 57 or 58, to a return conduit 59 which leads back to the tank 44.

For actuating the valve member in valve 56, a rotary four-way valve 60 is provided, this valve 60 being rotated to either of its two positions by the reversible three-phase electric motor 61. The inlet conduit 62 for valve 60 is supplied with low pressure liquid at all times by reason of its connection with conduit 46. The inlet conduit 62 is adapted to be connected by the rotary valve 60 either to the conduit 63 which leads to the top of valve 56 for shifting the valve member therein downwardly and thus connecting the low pressure in pump 46 to the righthand side of piston 54 so as to move the injection plunger 2 forward, or to the conduit 64 which connects with the lower side of valve 56 and is adapted to thus shift the valve member in valve 56 upwardly so as to connect the low pressure liquid in conduit 44 to the lefthand of piston 54 so as to retract the injection plunger. The valve 60 is provided with an exhaust conduit 73 which leads back to the tank 44 and connects the conduit 63 or 64 which is not in communication with the inlet conduit 62 to the exhaust conduit 73 and thus allows discharge of the liquid from the side of valve 56 towards which the valve member therein is being actuated.

Hydraulic control of mold clamping and nozzle opening

The conduit 45 leads to a four-way valve 65, the valve member of which is adapted to connect conduit 45 either to a conduit 66 leading to the right hand of clamping piston 10 or to a conduit 67 leading to the left-hand of clamping piston 10. At the same time, the valve member of valve 65 connects the conduit 66 or 67 which is not connected to the inlet conduit 45 to the return line 59 leading back to the tank 44.

In order to actuate the valve member in valve 65, a four-way rotary valve 68 is provided, this valve having a rotary valve member adapted to be actuated to either of its two positions by a reversible three phase electric motor 69. Valve 68 is connected by the inlet conduit 70 to the conduit 45 and is thus supplied at all times with liquid either under high pressure from pump 41 when check valve 48 is closed, or under low pressure from pumps 42 and 41 when check valve 48 is open. The valve member of valve 68 is adapted to connect the inlet conduit 70 either to a conduit 71 which leads to the top of valve 65 and to thus cause the valve member in valve 65 to be shifted downwardly so as to connect inlet conduit 45 to conduit 67 so as to cause the clamping ram 9 to move towards the injection cylinder 1, clamping the mold halves together, or to a conduit 72 which leads to the bottom of valve 65 and which is adapted to supply liquid pressure to cause the valve member in valve 65 to shift upwardly so as to connect the inlet conduit 45 to the right hand of clamping piston 10, thereby causing unclamping of the mold halves.

Rotary valve 68 is provided with an exhaust conduit 74 which connects with the exhaust conduit 73. Rotary valve 68 is likewise adapted to connect the conduit 71 or 72 which is not connected to the inlet conduit 70 to this exhaust conduit 74 and to thereby allow free movement of the valve member in valve 65.

Conduit 75 is provided between conduit 66 and the clamping and unclamping cylinder 11, this conduit 75 extending into communication with the space at the right-hand of piston 10 at a distance from the inlet of conduit 66 towards the left therefrom. This conduit 75 has a check valve 76 which allows liquid to pass outwardly through conduit 75 but prevents its reverse flow. The purpose of conduit 75 and check valve 76 is to prevent the clamping piston 10 from being forced to the right to such an extent as to bring the piston 10 into contact with the end of cylinder 11 which might injure the packing provided around the plunger 9, or otherwise do damage.

Hydraulic actuation of injection valve

As indicated diagrammatically in Fig. 1, the hydraulic valve actuating motor 28 is adapted to be placed into communication with the clamping conduit 67 through a conduit 77 by means of an admission valve 78, the spring-pressed valve member of which is adapted to be moved upwardly of Fig. 1 when the pressure in conduit 67 exceeds a predetermined amount so as to uncover the inlet of conduit 77 to admission valve 78 to thereby allow the fluid pressure to be communicated through conduit 77 into hydraulic motor 28 so as to open the injection valve 25 when the clamping pressure exceeds a certain figure due to the coming together of the mold halves. For allowing release of liquid under pressure from hydraulic motor 28, a check valve conduit 79 having a check valve 80 is provided between conduits 77 and 67. Thus, as the mold halves come together under the application of liquid pressure to the left-hand of piston 10, the liquid pressure increases in conduit 67, causing valve 25 to be opened by motor 28, allowing the injection plunger 2 which is held forward under this same holding pressure to move forward under this same holding pressure to cause injection. After injection has taken place and the application of liquid pressure is transferred to the right hand of clamping piston 10 so as to cause unclamping of the mold halves, the lowering of liquid pressure in conduit 67 causes the valve member in valve 78 to move under the action of its spring so as to cover the inlet of conduit 77, whereupon the motive element in hydraulic motor 28 moves under the action of its spring so as to close injection valve 25, the discharge of liquid from motor 28 taking place through check valve 80 and conduit 79 into conduit 67 which is now connected so as to discharge into the tank 44.

Electrical circuit controlling injection plunger

The operation of rotary valve 60 is controlled electrically as follows. The motor 61 of rotary valve 60 is connected so as to be operated in either direction from the incoming three phase line comprising wires 81, 82 and 83, by means of an armature 84 adapted to be pulled in one direction by a solenoid coil 85. Armature 84 carries switch arms 86, 87 and 88 which are so connected that when in one position, the motor 61 is operated in one direction and when in another position, motor 61 is operated in the reverse direction. The solenoid coil 85 is adapted to be energized by the closing of a normally open limit switch 89 which is arranged so as to be actuated by the injection plunger 2 when it reaches its fully retracted position, one side of the switch 89 being connected to the incoming wire 83, the other side being connected to the coil 85 by a wire 90 leading also to a contact adapted to be contacted by a holding switch blade 91 mounted on the armature 84. The other contact which is engaged by switch blade 91 is connected by a wire 92 to a wire 93 leading to the incoming power line 83. The other end of the solenoid coil 85 is connected by a wire 94 to a normally closed, manually operable switch 95, the other side of which is connected by a wire 96 to one contact 97 of a normally closed switch, the other contact 98 of which is connected by a wire 99 to a wire 100 which is connected to the incoming power line 82. Thus, normally a circuit is established through the coil 85, causing the armature 84 to be pulled leftwardly of Fig. 1, causing motor 61 to rotate the rotary valve 60 to such direction as to deliver pressure liquid to the top of reciprocable valve 56, thus causing the liquid pressure in line 46 to be normally applied to the right hand of injection piston 54, causing the injection plunger 2 to be normally pushed forwardly so as to exert a holding pressure upon the material in the injection cylinder. A spring 101 attached to armature 84 is adapted to pull it rightwardly whenever the circuit through coil 85 is broken, thereby breaking the holding circuit established by the switch blade 91 and causing motor 61 to operate in the reverse direction whereby the valve plunger in valve 65 is moved upwardly so as to connect conduit 46 to conduit 57 whereby the injection plunger is retracted.

The purpose of the manually operated switch 95 is to allow retraction of the injection plunger for filling the heating chamber at the start of operations. This switch is opened manually to cause the injection plunger to retract and when the operator sees that the injection plunger has retracted, he closes switch 95, causing the injection plunger to push its charge forwardly into the heating chamber. This is repeated several times until the heating chamber is full.

In order to cause retraction of the injection plunger at a predetermined time after injection has been completed, provision is made for automatically retracting plunger 2 at a time which is measured from the time when the clamping ram 9 attains a given position in its clamping stroke. This means takes the form of the trip switch 102 which is adapted to be tripped by a tripping member 103 fixedly carried at an appropriate point on the clamping ram 9. Tripping member 103 is adapted to trip the switch 102 in only the forward direction of operation of the ram 9. Preferably the tripping member 103 is adjustable longitudinally of clamping ram 9, as shown, whereby adjustment may be made in time when switch 102 is tripped. In this way, switch 102 is tripped on the forward clamping movement of ram 9 and is adapted to interconnect a line 104 which connects to line 93 and thus to power line 83 and a line 105 which connects to one side of a timing motor 106, the other side of which is connected by a line 107 to the line 100 and thus to the incoming power line 82. As a result, when switch 102 is tripped, the timing motor 106 is caused to rotate in a direction clockwise of Fig. 1 and to rotate timing cam 108. Immediately when timing cam 108 begins to rotate, it causes closing of a pair of contacts 109 and 110 which are normally held apart. Contact 110 is connected by a line 111 to the line 104, while contact 109 is similarly connected by a line 112 to the line 105. Thus a holding circuit is established the moment when motor 106 begins to rotate, whereby the motor 106 is allowed to rotate until one revolution has been completed, whereupon the timing cam 108 causes opening of the contacts 109 and 110, causing rotation of the motor to cease.

As the timing cam 108 is rotated and after a predetermined period after the tripping of switch 102, it causes opening of contacts 97 and 98, thereby causing de-energization of coil 85, causing reversal of motor 61, in turn causing application of fluid pressure to be transferred from the top of valve 56 to the bottom thereof, causing interconnection of conduits 46 and 57, causing retraction of the injection plunger 2.

As the injection plunger 2 attains its fully retracted position, it closes the normally open limit switch 89, thereby causing coil 85 to be again energized and causing reversal of motor 61, causing the injection plunger 2 to move forwardly, the parts being as shown in Fig. 1. It will be understood that the timing cam 108 will have continued to rotate in the meantime and will have closed the contacts 97 and 98 so that the holding circuit is established by switch blade 91 at the instant when the limit switch 89 is closed.

Electrical circuit controlling clamping ram

The motor 69 which actuates the rotary valve 68 so as to shift the valve member in the valve 65 to control motion of the clamping ram 9, is adapted to be placed into connection with the incoming power lines 81, 82 and 83 by suitable connecting wires adapted to be interconnected by switch bars 113, 114 and 115. Switch bars 113, 114 and 115 are mounted on an armature 116 which is adapted to be normally pulled rightwardly of Fig. 1 by a spring 117 whereby rotary valve 68 is shifted normally so as to normally position the valve member in valve 65 upwardly, connecting pressure conduit 45 to the unclamping conduit 66 and applying liquid pressure to the right hand of the clamping piston 10. In order to pull the armature 116 leftwardly of Fig. 1 so as to reverse the application of liquid pressure from conduit 66 to conduit 67, solenoid coil 118 is provided for armature 116. This coil 118 is connected by a line 119 to the power line 82 and the other end of coil 118 is connected to a wire 120, one end of which leads to a contact adapted to be engaged by a manually operated clamping switch 121. The other contact of switch 121 is connected by a lead 122 to the incoming power line 83. Wire 120 also is connected to a contact which is adapted to be engaged by a holding switch bar 123 fixedly mounted on the armature 116. The other contact engaged by switch bar 123 is connected by a wire 124 to one side of a normally closed, manually operated unclamping switch 125, the other end of which is connected to power line 83. In this way, closing of switch 121 manually causes the coil 118 to be energized, resulting in the shifting of the valve member in valve 65 and causing the liquid pressure from conduit 45 to be applied to the left-hand of clamping piston 10, thus causing clamping ram 9 to move rightwardly, clamping the mold halves. As soon as switch 121 is actuated a holding circuit is established by switch bar 123. With the mold halves clamped, manual opening of switch 125 breaks the holding circuit and allows the armature 116 to be moved rightwardly by its spring 117, causing the valve member in valve 65 to assume the position of Fig. 1 and causing unclamping of the mold halves.

Operation

The operation of the apparatus is as follows: When starting operation, the injection plunger 2 is reciprocated several times by opening manually the switch 95 several times, the switch 95 being held open each time until the injection plunger has fully retracted and then being allowed to close so as to move the injection plunger forwardly, packing the granular plastic into the heating chamber. When the heating chamber is thus filled, this reciprocation is ceased, the switch 95 being closed and the injection plunger 2 is now held forward under pressure from conduit 46. During this time, the clamping ram 9 is held retracted because the valve 65 is in the position shown in Fig. 1, the start or clamping switch 121 being open.

To initiate the molding operation, the clamping switch 121 is closed manually, causing the reversal of motor 69 and the shifting of the valve member in valve 65 so as to cause the application of low pressure liquid from conduit 45 to the left-hand of the clamping piston 10. This causes the clamping ram 9 to move rightwardly, bringing the mold halves toward one another. At the same time, the same liquid pressure is applied to the cushioning cylinders 13. When the mold halves come together, the resistance offered by the choke 52 allows the cushioning rams 12 to move slowly rightwardly until the mold half 5 engages the injection nozzle 4. In the meantime, the resistance to flow in line 67 has caused the check valve 48 to close and caused the high pressure output of pump 41 to be applied to the lines 67 and 49. This causes high clamping pressure to be exerted on the mold. As the clamping ram 9 approaches its innermost position, at which time the mold halves are closed and the apparatus is ready for injection, the tripping member 103 carried by the ram 9 causes the tripping of the trip switch 102, energizing the timing motor 106 and causing it to begin to rotate while the clamping pressure is further built up to a maximum. As soon as the motor 106 begins to rotate, the cam 108 causes closing of contacts 109 and 110, thereby establishing a holding circuit which keeps motor 106 rotating.

After clamping of the mold halves is complete, the increase in pressure in the line 67 above the high pressure therein causes opening of the admission valve 78, allowing the liquid under this extremely high pressure to be admitted to the nozzle valve operating motor 28, causing the nozzle valve 25 to be opened. As soon as the valve 25 opens, the injection plunger 2 which was already held forward under pressure, moves forward causing injection of the fluent material from the heating chamber into the mold.

Meanwhile the timing cam 108 has continued to rotate and after a predetermined time sufficient to allow complete filling of the mold and sufficient holding of pressure on the injection plunger thereafter and the desired degree of setting in the mold, the cam 108 causes contacts 97 and 98 to be separated, causing breaking of the circuit through coil 85, causing the armature 84 to move rightwardly, causing motor 61 to reverse, causing the valve member in valve 56 to shift upwardly and causing retraction of the injection plunger in order to recharge the heating cylinder.

As soon as the injection plunger 2 starts rearwardly, the unclamping switch 125 which is normally closed is opened manually, causing reversal of the rotary valve 68, causing shifting of the valve member in valve 65 back to the position shown in Fig. 1, causing the application of liquid pressure in conduit 66 and causing the clamping ram 9 to unclamp the mold halves. The reduction in pressure in the line 67 which is now the discharge line for clamping cylinder 11 causes the admisssion valve 78 to close and the nozzle valve 25 to close, the liquid in the motor 28 discharging through conduit 79 into the discharge conduit 67.

When the injection plunger 2 approaches the fully retracted position, it actuates the limit switch 89 which is normally open so as to close the circuit through the coil 85, causing the rotary valve 60 to be reversed, causing the valve member in valve 56 to shift downwardly into the position in Fig. 1, thus causing the hydraulic liquid to be applied to the right-hand of piston 54, causing the injection plunger to reverse and move forwardly, carrying ahead of it the charge of granular plastic which accumulated in front of it as it was retracted.

Injection plunger 2 moves forwardly and holds at its forward position under pressure the circuit remaining as shown. As the cam 108 completed its single revolution, it opened the holding circuit through motor 106, causing the timing motor 106 to stop.

The molding cycle is now complete and the machine is in position for another cycle which is accomplished in the same manner.

If desired, operation of the unclamping switch 125 may be delayed until after the injection plunger 2 has been retracted, has effected its charging, and has attained its forward position under pressure, since it is impossible to force material through the open valve 25 because the mold is full. In such case, the next step would be to manually operate the unclamping switch 125, thereby causing closing of the nozzle valve 25 at the same instant as the mold halves start to separate and preventing plastic material from being injected after the mold halves have begun to separate and allowing the fluent material in the heating cylinder to be held under the holding pressure exerted on the injection plunger 2 until it is desired to make the next injection.

If desired, instead of operating the unclamping switch 125 manually, relying on the observation of the operator and necessitating continuous attention throughout the molding cycle, switch 125 may be operated automatically so that it is opened at any desired time from the point where the injection plunger has caused complete filling of the mold to the point where the injection plunger has resumed its holding pressure upon the plastic material in the heating cylinder. For example, switch 125 might be opened by the timing cam 108.

Instead of operating the nozzle valve by the pressure in clamping line 67, it may be operated in other ways, such as for example, directly by the movement of the mold halves together, whereby it is likewise insured that the valve is not opened except when the mold halves are clamped together to the injection nozzle. Also, the valve 25 might be arranged so that it would be opened by the forward motion of the injection plunger 2 although this would necessitate a complete change in the molding cycle from that described above because holding pressure would not in such case be exerted by the injection plunger 2.

Modification

In the modification shown in Figs. 5 and 6, the mold halves 127 and 128 are clamped together and to the injection nozzle 126 in the same manner as that described above, the injection nozzle 126 being integral as before with the torpedo 18 which is screwed into the injection cylinder. The nozzle is valved by a streamlined valve member 129 which is adapted to be moved forwardly by the plastic material in the heating cylinder, valve member 129 being reciprocable within an enlarged cylindrical space 130 formed at the point of convergence of the inclined passageways 21. The valve member 129 is supported and moved by a rod 131 which is integral with the valve member 129 and which is slidably mounted in the bore 132 in the nozzle 126. The rod 131 extends leftwardly so as to be engaged at its end 133 by the motion of the mold half 128 towards the injection nozzle 126. Thus the valve member is moved rightwardly in the space 130 and allows plastic material to flow outwardly. The rod 131 is fluted lengthwise to accommodate the plastic and conduct it into the mold cavity, the flutes being designated as 134 and the ribs being designated as 135. The cross-section is thus cross-shaped for maximum rigidity. The ribs 135 have their peripheral ends shaped so as to correspond with the inner periphery of bore 131. The member 129 is moved rightwardly sufficiently to expose well the ends of the flutes 133, so that the fluent material is free to flow into the flutes and into the mold. Thus, no restriction to flow is offered at this point.

With this modified form of valving, the injection nozzle is opened at the instant when clamping of the molds to the injection nozzle occurs and is closed at the instant when mold half 128 is pulled away from nozzle 126.

General

From the foregoing, it will be seen that the present invention provides for the injection molding of thermosetting resins by heating them to fluency while confining them so as to prevent the liberation of gas and injecting the material into a mold where free escape of gas is allowed and where heating is carried out to a sufficient extent to permanently set the material. It will be understood that the drawing of a vacuum upon retraction of the injection plunger is prevented because the heat causes gas under pressure to be liberated ahead of the injection plunger and this gas is merely lowered in pressure as the injection plunger moves rearwardly. Similarly, as the injection plunger moves forwardly it merely compresses this gas and any entrapped air and therefore relief is not necessary. It will further be understood that the momentary release of the pressure of the gases during recharging of the injection cylinder is not sufficiently prolonged to allow appreciable setting of the resin.

The maintenance of the proper temperatures will depend upon the resin or plastic being injected. Many of the phenolics become fluent in the heating chamber at 140° C. and may be hardened in the mold at this temperature by sufficiently prolonged maintenance thereof, although preferably a temperature of at least 130° C. is maintained in the heating chamber and at least 150° C. in the mold. The urea resins set at between 130° and 140° C. and may be heated to at least 130° C. in the heating chamber and at least 150° C. in the mold although a lower temperature, say 140 C., may be maintained in the mold. Under some circumstances, the temperature in the heating cylinder may be as low as 100° C., especially if the material is subjected to very high pressure, say 30,000 to 40,000 pounds per square inch, during the heating and also during injection, since the materials flow much more readily as the pressure upon them is increased.

If desired, the maintenance of the desired temperature at a constant level may be effected by the method of my copending application, Serial No. 309,797, filed December 18, 1939, which discloses the use of a fused bath at the fusion point around the injection cylinder.

The rotary valves 60 and 68 are of the type shown in my copending application, Serial No. 167,184 filed October 4, 1937, and are actuated by torque motors 61 and 69 respectively which are adapted to operate in continuous stalled service as is also disclosed in said application.

I wish it to be understood that I intend to include as within my invention such modifications as may be necessary to adapt it to varying conditions and uses and as fall within the terms or spirit of the appended claims.

Having thus fully described my invention, what I claim as new and desire to secure by Letters Patent is:

1. Injection molding apparatus comprising an injection cylinder having a bore, means for heating said cylinder, an injection plunger reciprocable in said bore, said plunger being larger than and not slidable in said bore under normal temperature conditions, and means for controlling the diameter of said plunger to just that which is slightly smaller than said bore and slidable therein in gas tight relationship when said cylinder is heated comprising passageways in said plunger and means for circulating a cooling medium at controlled temperature through said passageways.

2. Injection molding apparatus comprising an injection cylinder having a bore, an injection passageway leading from said bore, valve means for opening and closing said passageway, means for heating said injection cylinder, an injection plunger in gas tight but slidable relationship in said bore, means for normally closing said valve, means for applying pressure upon said plunger to normally position the same against plastic material in said bore to continuously exert pressure on the material in said bore, and means for causing reciprocation of said plunger upon completion of injection of material into the molds of the injection molding apparatus to feed plastic material into said bore and to reestablish pressure upon the material.

3. Injection molding apparatus comprising an injection cylinder having a bore, an injection passageway leading from said bore, normally closed valve means constructed and arranged for opening and closing said passageway, an injection plunger slidably mounted in said bore and constructed and arranged to prevent escape of gas evolved by material placed within said bore, means for normally positioning said plunger forwardly in said bore to normally retain pressure on the material in said bore, cooperating mold halves adapted to form a mold cavity in communication with said passageway, means for clamping said mold halves together under pressure, and means actuating said valve means to open said passageway when said mold halves are clamped under pressure, said opening of said valve permitting said plunger to move forward under pressure normally retained thereon to cause material to be ejected from said bore into said mold cavity.

4. Injection molding apparatus comprising an injection cylinder having a bore, an injection passageway leading from said bore, an injection plunger slidably mounted in said bore and normally positioned forwardly in said bore, pressure means for normally retaining said plunger toward the forward end of said bore to continuously maintain material in said bore under pressure, cooperating mold halves adapted to form a mold cavity in communication with said passageway, means for clamping said mold halves together, and means actuated by clamping of said mold halves for opening said injection passageway to release material normally retained under pressure by said injection plunger.

5. Injection molding apparatus comprising an injection cylinder having a bore, an injection passageway leading from said bore, a normally closed valve in said passageway for opening and closing the same, an injection plunger slidably mounted in said bore, pressure means for normally placing said plunger in a forward position in said bore to compress material therein and normally maintain pressure thereon, cooperating mold halves adapted to form a mold cavity in communication with said passageway, pressure means for clamping said mold halves together, means actuated by said pressure clamping means immediately upon development of clamping pressure for opening said valve, said plunger pressure means moving said plunger forward of its normal position upon release of material from said bore through said open valve to cause material to be injected into said cavity on said plunger, and time delay means actuated by said clamping pressure means for effecting a reciprocatory charging stroke of said injection plunger while said molds are closed to feed material into said bore and reestablish the normal pressure maintained on the material in the bore.

6. Injection molding apparatus comprising an injection cylinder having a bore, an injection passageway leading from said bore, a normally closed valve in said passageway for opening and closing the same, an injection plunger slidably mounted in said bore, pressure means for normally placing said plunger in a forward position in said bore to compress material therein and normally maintain pressure thereon, cooperating mold halves adapted to form a mold cavity in communication with said passageway, pressure means for clamping said mold halves together, means actuated by said pressure clamping means immediately upon development of clamping pressure for opening said valve, means for releasing pressure on the mold halves for unclamping said mold halves, and actuating means released by release of clamping pressure for immediately closing said valve to prevent material being forced through said passageway by the pressure normally maintained on the material by said plunger.

7. Injection molding apparatus comprising an injection cylinder having a bore, an injection passageway leading from said bore, a normally closed valve in said passageway for opening and closing the same, an injection plunger slidably mounted in said bore, pressure means for normally placing said plunger in a forward position in said bore to compress material therein and normally maintain pressure thereon, cooperating mold halves adapted to form a mold cavity in communication with said passageway, pressure means for clamping said mold halves together, means actuated by said pressure clamping means immediately upon development of clamping pressure for opening said valve, said plunger pressure means moving said plunger forward of its normal position upon release of material from said bore through said open valve to cause material to be injected into said cavity by the pressure normally maintained on said plunger, time delay means initiated by said clamping means for retracting said injection plunger after a predetermined time interval after clamping has been effected, and means operated by said injection plunger as it approaches its retracted position for stopping said retraction and causing an immediate forward movement of said plunger under the influence of said pressure means for said plunger to reposition the plunger forwardly in said bore and reestablish pressure on the material in said bore.

8. Injection molding apparatus comprising an injection cylinder having a bore, an injection passageway leading from said bore, a normally closed valve in said passageway for opening and closing the same, an injection plunger slidably mounted in said bore, pressure means for normally placing said plunger in a forward position in said bore to compress material therein and normally maintain pressure thereon, cooperating mold halves adapted to form a mold cavity in communication with said passageway, pressure means for clamping said mold halves together, means actuated by said pressure clamping means immediately upon development of clamping pressure for opening said valve, said plunger pressure means moving said plunger forward of its normal position upon release of material from said bore through said open valve to cause material to be injected into said cavity by the pressure normally maintained on said plunger, time delay means initiated by said clamping means for retracting said injection plunger a predetermined time interval after clamping has been effected, means for actuating said pressure clamping means to initiate unclamping of said molds, means responsive to a release of clamping pressure to close said valve, and means operated by said injection plunger as it approaches its retracted position for stopping said retraction and causing an immediate forward movement of said plunger by said plunger pressure means to reposition the plunger forwardly in said bore to reestablish pressure on the material in said bore, said mold clamping release and closure of said valve being effected while said injection plunger is traversing its reciprocatory stroke.

WARREN R. TUCKER.